United States Patent
Hornung

[11] 3,791,673
[45] Feb. 12, 1974

[54] FOLDING MEANS FOR IMPLEMENT FRAME STRUCTURES

[75] Inventor: Michael C. Hornung, Spearville, Kans.

[73] Assignee: American Products, Inc., Spearville, Kans.

[22] Filed: Nov. 8, 1972

[21] Appl. No.: 304,651

[52] U.S. Cl............. 280/411 A, 280/421, 172/311, 172/456
[51] Int. Cl............................................ B62d 53/00
[58] Field of Search ....... 280/411 A, 421, 412, 413; 172/311, 456, 619

[56] References Cited
UNITED STATES PATENTS

| | | | |
|---|---|---|---|
| 2,788,908 | 4/1957 | Lynd................... | 214/505 |
| 3,493,246 | 2/1970 | Tasset et al............ | 280/411 A |
| 3,493,247 | 2/1970 | Tasset et al............ | 280/411 A |
| 3,521,905 | 7/1970 | Tasset et al............ | 280/411 A |
| 3,698,488 | 9/1970 | Yoder et al............ | 172/619 X |
| 3,738,682 | 6/1973 | Ritter................. | 280/413 |

Primary Examiner—Leo Friaglia
Attorney, Agent, or Firm—John H. Widdowson

[57] ABSTRACT

A foldable frame for agriculture implements has a frame section with a rear sectional foldable support beam transversely. The support beam is hinged to allow movement of the sections to fold in a forward position, when desired, and then unfold to an extended working position. The sections of the support beam rise and fall with variations in the surface of the ground. Wheels support the end sections of the support beam. The foldable support beam carries farm implements, such as a grain drill, and is pivotally connected at the end sections to a pair of forwardly extending converging folding link members which cooperate with the hinges of the support beam to allow the end sections of the foldable support beam to be folded in a forward direction. A double acting hydraulic cylinder is mounted on a central longitudinal tongue of the frame with the rod thereof connected to a slide in turn connected to the folding link members to extend and retract same. The folding link members provide protected passageways for wheel operating fluid conduits. The end sections of the folding support beam, and thus the implement mounted thereon are maintained in a horizontal position with the central section of the support beam in both the folded and unfolded or extended position.

6 Claims, 7 Drawing Figures

FOLDING MEANS FOR IMPLEMENT FRAME STRUCTURES

The foldable frame structure of this invention is an improvement on that of the U.S. Pat. No. 3,493,247.

Several other types of foldable farm implement structures are known in the prior art, however, these foldable frame structures have certain features which make them undesirable for mounting equipment such as grain drills. These prior art foldable structures fold the end sections of the extended portion of the frame structure upward to a storage position above the center portion of the structure. Thus, a grain drill when mounted on such a foldable structure must be emptied of it's contents prior to folding the structure since the material of the containers would be dumped onto the ground and wasted. Emptying of the grain drill containers is very time consuming, wasteful, and an expensive process. Other types of foldable frame structures are of a rigid construction, and do not provide for up and down relative movement of the end sections of the structure. With the type of rigid foldable structure the implement will not operate properly on uneven terrain because the operating depth at which the tool will work is not the same. Other prior art folding structures are fluid actuated and require great lengths of flexible hose to connect the various actuators devices to the fluid source on the tractor. These foldable structures have the fluid hoses exposed and often create problems when folding the structure because the hose is easily punctured or pinched during the folding operation. This type of folding device requires a high degree of care on the part of the operator to prevent damage to the hoses. Other folding frame structures utilize closed conduits as structural members of the device to carry operating fluid for fluid actuated cylinders and pistons of the device, while the members also act as a supporting frame. These types of folding implement structures provide security for the fluid communication, however, they add a considerable weight to the overall frame structure due to the large amount of operating fluid, usually hydraulic oil, which must be carried with the integral structural parts of the device. Additionally, these frame structures with integral conduits for the operating fluid present additional problems in servicing of the apparatus and bleeding air from the hydraulic system so that it will operate properly.

In one preferred specific embodiment, a folding for implement frame structures is provided having a frame structure adapted to be connected to a towing vehicle which has a sectional support beam adapted to carry a farm implement, such as a grain drill, or an ammonia drill, with the central section of the support beam being raiseable and lowerable in cooperation with folding conduit link members, which are connected with the end sections of the sectional support beam and are adapted to be convergingly folded forward. A sectional support beam is adapted to carry the farm implement and is provided with a central section and an end section pivotally connected to the central section. The central section of the sectional support beam is pivotally connected to the frame structure so as to transversely extend therefrom. A first wheel means is pivotally connected to the frame structure and operates to raise and lower the frame structure relative to the ground, thereby, raising and lowering the sectional support beam. A second wheel means is pivotally connected to the end section of the support beam and operates to raise and lower the end sections of the support beam. A folding link conduit is provided, which is pivotally connected at one end to the frame structure and pivotally connected at the other end to the end section of the sectional support beam. The folding link conduit provides a protected passageway for fluid conduits which are used to provide operating fluid communication between the second wheel means and a fluid source on the towing vehicle. A powered slide mounted on the frame structure is pivotally attached to a connecting rod with the forward portion of the forward most folding link and the slide is adapted to in operation move the folding link structure between a folded position and an extended or unfolded position. As the folding link structure is folded inward toward the frame, its movement causes the end section of the sectional support beam to be pivoted in a forward and horizontally extending position with respect to the central section of the sectional support beam. The slide is powered by a piston and cylinder, which is connectable with the fluid source of the towing vehicle for its operation to provide an easy and convenient means of folding and unfolding the implement structure. Flexible conduits connecting the fluid source of the towing vehicle with the second wheel means pass through and are protected by the conduits of the foldable link structure.

One object of this invention is to provide a folding means for implement frame structures overcoming the aforementioned disadvantages of the prior art devices.

Still one other object of this invention is to provide a folding frame means for implement frame structures having a sectional support beam connected to a supporting frame and transversely extending therefrom wherein the sectional support beam is maintained in a horizontal position in both the folded position and in the extended position.

Still, another object of this invention is to provide a folding means for implement frame structures with a wheel support means for the end section of the sectional support beam, which operates independently of a wheel means on the supporting frame structure.

Still, another object of this invention is to provide a folding means for implement frame structure, which provides a protected passageway for flexible conduits that supply activating fluid from a fluid source on a towing vehicle to the wheel operating apparatus carried by the wheel means for the supporting end section of the sectional support beam.

Still, another object of this invention is to provide a folding means for implement frame structures where in the folding link conduits will in the folded position be along side the frame structure when it is in the folded position.

Yet, another object of this invention is to provide a folding means for implement frame structures having a powered slide on the frame structure that is movable by a cylinder and piston, with a slide being attached by a connecting rod to the forwardmost folding link conduit to in operation move the entire conduit linkage and the end section of the sectional support beam between the folded position and the extended position.

Yet, another object of this invention is to provide a folding means for implement frame structures having elongated folding conduit links, which provide a protected passageway for flexible fluid conduits connecting the fluid source of the towing vehicle to the wheel operating apparatus of the wheel means on the end section of the sectional support beam.

Various other objects, advantages, and features of the invention will become apparent to those skilled in the art from the following discussion taken in conjunction with accompanying drawings, in which.

Figure 1:
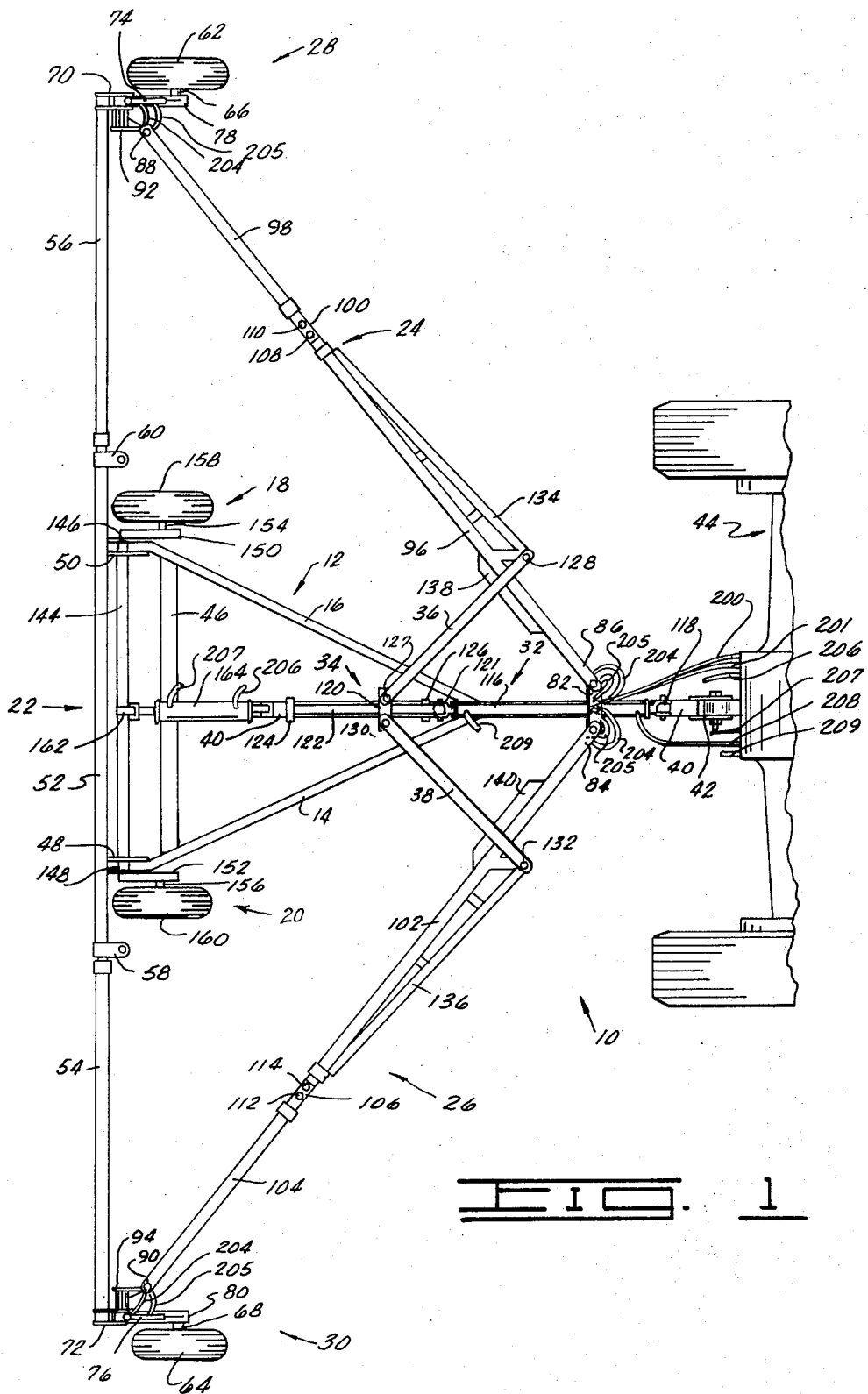
FIG. 1 is a top plan view of the folding frame structure in the extended position, and shown connected to the rear of a tractor.

The following is a discussion and description of preferred specific embodiments of the folding means for implement frame structures of this invention, such being made with reference to the drawings, whereupon the same reference numerals are used to indicate the same or similar parts and/or structure. It is to be understood that such discussion and description is not to unduly limit the scope of the invention.

Figure 4:
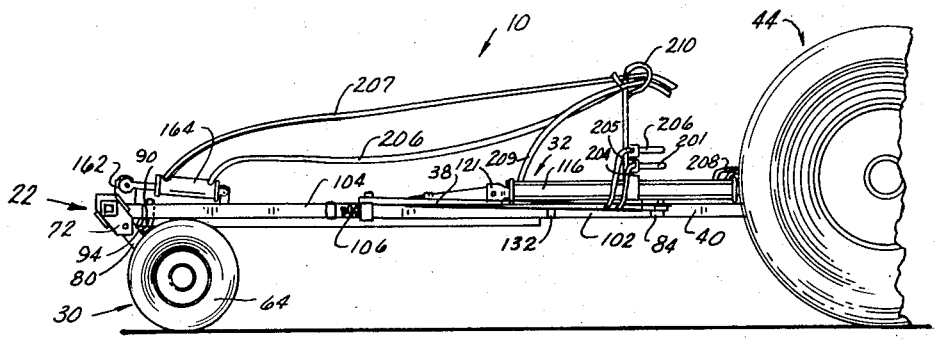
FIG. 4 is a side elevation view of the folding frame structure in the extended position attached to the rear portion of a tractor.
Figure 5:
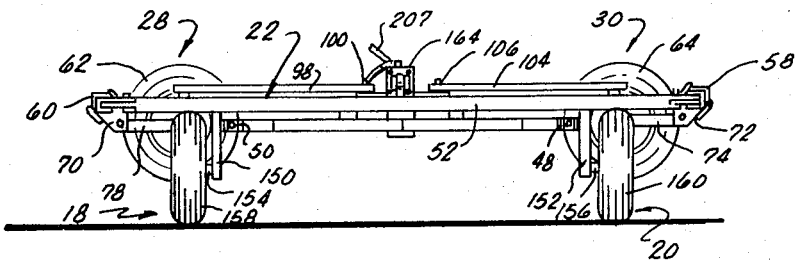
FIG. 5 is a rear elevation view of the folding frame structure alone in the folded position with the wheels of the end section raised.

Referring to the drawings, and in particular to FIG. 1 and FIG. 4, the frame structure for farm implements, generally indicated at 10 is shown therein. The frame structure 10 is provided with a generally horizontally disposed A-shaped frame structure 12 with forwardly converging elongated members 14 and 16, a pair of first wheel means 18 and 20, a sectional support beam 22, a pair of forwardly converging folding link conduit means 24 and 26 and a second pair of wheel means 28 and 30. A conduit link moving means 32 is mounted on the frame structure 10 and includes a slide 34 pivotally joined by connecting rods 36 and 38 to the forwardly converging folding link conduits 24 and 26 respectively to facilitate their movement.

The frame structure 10 is provided with a tongue extending forward from the A-frame portion of the structure 12 and having a mounting plate 42 on the ends thereof to couple and connect the frame structure with a tractor 44. The tongue 40 is rigidly connected to the forwardly converging members 14 and 16 of the A-frame. At its rear portion, the tongue 40 is connected to a cross member 46 joined between the forwardly converging A-frame members 14 and 16. The rearward most ends of the elongated members 14 and 16 are pivotally connected to the sectional support beam 22 by clamp means 48 and 50, thereby connecting the sectional support beam 22 to the A-frame means 12 so the sectional support beam 22 extends therefrom. The slide 34 and its moving means 32, as will be described in the hereinafter, are mounted on the top of the tongue 40. The sectional support beam 22 is provided with a center section 52 and opposed pivotally attached end sections 54 and 56 joined thereto by hinge means 58 and 60 respectively. Preferably, the central section 52 and end sections 54 and 56 of the sectional support beam 22 are formed of square or rectangular tubing material. The end sections 54 and 56 are axially aligned by the hinge means 58 and 60 and forwardly folded with respect to the central section 52.

Figure 3:
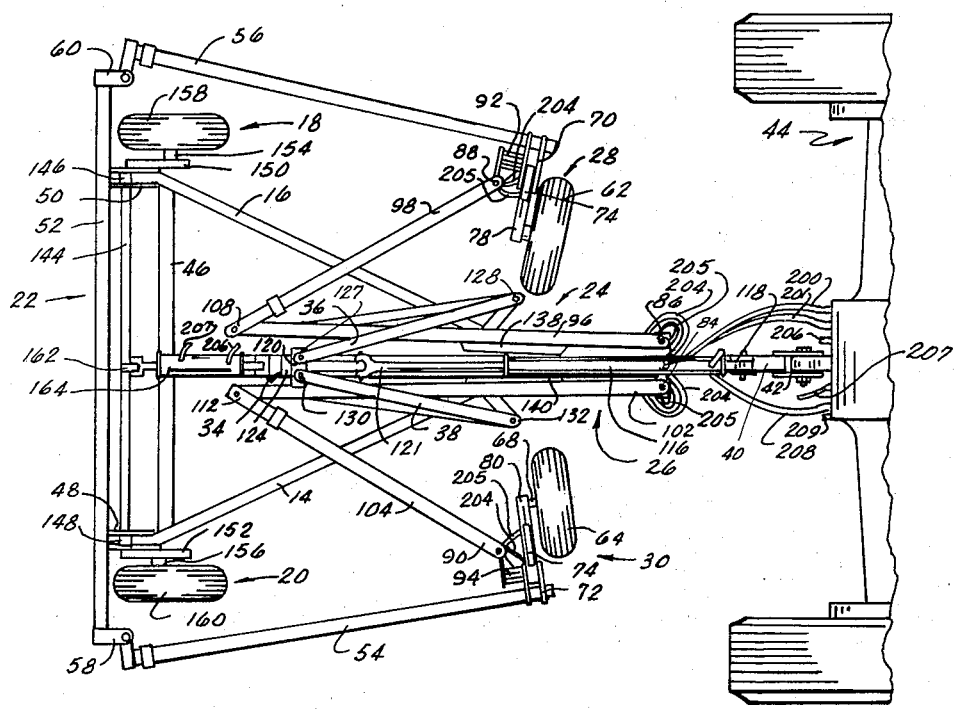
FIG. 3 is a top plan view of the folding frame structure in the folded position shown attached to the rear of a tractor.

FIG. 3 shows the structure in the folded position. A second pair of wheel means 28 and 30 are provided with wheels 62 and 64 and are positioned at the outer end portion of the opposed support beam sections 54 and 56 respectively. The wheels 62 and 64 are operatively mounted on axle spindles 66 and 68 extending from brackets 70 and 72 which are in turn secured to the opposed end sections 56 and 54 of the sectional support beam 22. Cylinder and piston means 74 and 76, such as hydraulic cylinders and pistons, are mounted on arms 78 and 80 and connected to the brackets 70 and 72 so that upon actuation of the cylinders 74 and 76 the arms 78 and 80 and the wheels 62 and 64 are rotated and the wheels 62 and 64 are raised and lowered relative to the sectional support beam 22.

Forwardly converging folding link conduit means 24 and 26 are pivotally connected at the forwardly extending portion of the tongue 40 by a support 82 extending horizontally from the tongue and pivotally attached to hinge elements 84 and 86. Folding link conduit means 24 and 26 are pivotally connected at their rearward most ends to the opposed end sections 54 and 56 of the sectional support beam by pivot joints 88 and 90, respectively. The pivot joints 88 and 90 are attached on brackets 92 and 94, respectively, and extend inwardly from the brackets 70 and 72 that join second wheel means 28 and 30 to the beam end sections 56 and 54. The pivot joint means 88 and 90 are adapted to allow for horizontal and vertical flexure of the folding link conduits 24 and 26 relative to the opposed end sections 56 and 54. Folding link conduit means 24 is provided with two conduit members, a forward conduit member 96 and a rear conduit member 98 pivotally connected on their adjacent ends by a hinge means 100. Folding link conduit means 26 has two conduit members, a forward conduit member 102 and a rear conduit member 104 which are pivotally joined on their adjacent ends and by a hinge means 106. The adjacent ends of the folding link conduits 24 and 26 are constructed with overlapping hinge elements so as to provide for a pivoting motion and a lock. The hinge means 100 is provided with a pivot pin, indicated at 108, and if desired with a locking pin, indicated at 110. The pivot pin 108 is permanently installed in the juncture of the conduit members 96 and 98 and the locking pin 110 is desirably removably placable in cooperating apertures of the hinge elements so as to rigidly fix the links position when extended. The hinge means 106 has a pivot pin 114 permanently placed therein and a locking pin 112 removably placable through apertures of the hinge to make it rigid when in the extended position. When it is desired to fold the frame structure 10 of this invention the locking of pins 110 and 112 must be removed from the respective hinge means so the hinge will pivot properly. When it is desired to retain the structure in the extended position the locking pins 110 and 112 should be inserted through the appropriate apertures to maintain the structure in the rigid position.

The conduit link moving means 32 for the slide 34 is a cylinder and piston 116 which is supported above the tongue 40. A bracket 118 attaches the forward end of the cylinder and piston 116 to the tongue 40 with the piston extendable in the direction of the rear of the frame structure 10. This slide 34 has a transverse member 120 connected with the pistons end 121 and movably mounted on a slide guide element 122 that is attached to the top of the tongue 40. The slide transverse member 120 is an elongated beam supported in a spaced relation above the tongue 40 on brackets 124 and 126. The outer end portions of a slide transverse member 120 are pivotally joined with the connecting rods 36 and 38 which join it to the folding link conduit means 24 and 26 respectively. The connecting rod 36 has a pivot pin 127 attaching it to the slide transverse member 120 and another pivot pin 128 connecting it with the forward folding link conduit 96. The other connecting rod 38 has a pivot pin 130 on one end thereof connecting it to the slide transverse member 120 and another pivot pin 132 on its opposite end pivotally joining it with the other forward folding link conduit 102.

The forward folding link conduits 96 and 102 have outer structural elements 134 and 136 respectively on the outside portion thereof or the side opposite the A-frame structure 12. The outer structure elements 134 and 136 are in the same plane as the conduit members and provide mounts for the ends of the connecting rods 36 and 38. Additionally, the folding link conduit members 96 and 102 each have a flange on the inner portion thereof and extending inwardly or toward the A-frame structure 12. The flange 138 extends from the folding link conduit 96 and the flange 140 extends from the other folding link conduit 102. The flanges 138 and 140 are preferably positioned as shown in FIG. 1. When the frame structure 10 is in the folded position the flanges 138 and 140 pass over the A-frame 12 in the area of the tongue 40 and give structural support to conduits of the folded structure.

The first wheel means 18 and 20 are mounted with the A-frame structure 12 so as to be pivotable relative thereto and in operation raise and lower the A-frame structure relative to the ground. The first wheel means structures 18 and 20 include a rotatable transverse member 144 at the rear portion of the A-frame structure supported on brackets 146 and 148 above the elongated A-frame side members 14 and 16, arms 150 and 152 are secured to the transverse member 144 and have spindles 154 and 156 extending therefrom to mount the first wheel means wheels 158 and 160. The transverse member 144 has an arm 162 pivotally attached to a cylinder and piston apparatus 164 which is mounted on the tongue 40. The transverse member 144 is rotated by the cylinder and piston 164 attached to the arm 162, and as such is rotated the arms 150 and 152 move the wheels 158 and 160 up and down relative to the A-frame structure 12 and thereby raise and lower it relative to the ground.

Figures 6, 7:
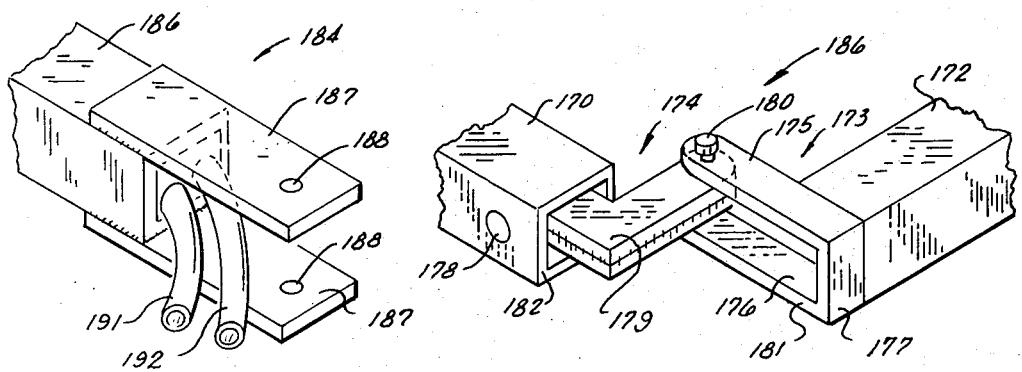
FIG. 6 is an enlarged perspective view of an end portion of a folding link conduit with a pair of flexible conduits extending therefrom.
FIG. 7 is an enlarged perspective view of the hinge element of the sectionalized support beam same being in an angular position.

FIG. 7 shows in detail the hinge means of the sectional support beam 22; this hinge means for purposes of the detailed description is generally indicated at 168. The hinge 168 is a pivotable connection between two conduit members 170 and 172 and is designed to retain them in a rigidly axially aligned relation when the support beam 22 is in the extended position and in addition, it is so designed to give the joint a maximum strength when the support beam 22 is in the folded position. The conduit 172 is provided with a U-shaped yoke member 173 attached to its end and the other conduit 170 is provided with an L-shaped body member 174 attached to its end portion. The U-shaped yoke member has a pair of parallel legs 175 and 176 on its opposite sides integral with a base member 177. The L-shaped body member has a pair of L-shaped plates 179 welded together and mounted by a pin 178 in the center portion of the conduit 170. The extended portions of the plates 179 and the legs 175 and 176 are joined by a pin element 180 to accomplish the pivoting action. The width of the legs 175 and 176 and the plates 179 is the same so that when the conduits 170 and 172 are in the aligned position the end surfaces of the respective parts, indicated at 181 and 182, are adjoining.

FIG. 6 shows in detail one end of a folding link hinge element. The end of the hinge element shown in FIG. 6 is generally indicated at 184 and is shown to represent the ends or center folding hinge of the folding link conduits 24 or 26. The hinge element shown 184 is hollow and includes a rectangular hollow conduit 186 having end plates 187 extending therefrom its end as shown. A pair of apertures 188 through the plates 187 are used to mount the hinge element by means of a pin or locking bolt. In the case of the hinge element 184 being the portions of the conduits at the folding conduit hinges 100 and 106 the flanges 187 must have an additional set of apertures (not shown) so one set can be used for the pivot pin and the other for the locking pin. It is to be noted that the plates 187 extend a distance from the end of the conduit 186, this is to provide sufficient clearance for the flexible conduits 190 and 191. The flexible conduits 190 and 191 are representative of flexible fluid conduits used in the actuation of cylinders and pistons on the second wheel means of this structure. The conduit 186 since it is hollow provides a protected passageway for the flexible conduits and is adapted to prevent damage to them during use and operation of the foldable structure. The exposed portions of the flexible conduits are at the ends of the converging folding link members and in a small area at the center hinge joints thereof, thus minimizing the exposure of the conduits and in turn minimizing the possibility of damage thereto.

A plurality of flexible conduits, such as hoses, connect the fluid source of the tractor 44 to the various cylinder and piston means of the frame structure 10. The fluid source connections are shown on the rear portion of the tractor and are preferably equipped with quick-disconnect type hose fittings to provide for an easy attachable and removable fluid connection with the fluid source of the towing vehicle. One pair of fluid conduits 200 and 201 are joined at separate T-elements supported above the slide cylinder 116. These conduits 200 and 201 provide fluid communication between the fluid source and the second wheel means and are connected from the T's and pass through the folding link conduits to the second wheel means cylinders 74 and 76. The conduits 200 and 201 are each connected to a separate T-element and in turn have corresponding conduits 204 and 205 connected thereto passing therethrough the folding link conduit means 24 and 26 emerging at the rearward most end thereof and connected to the second wheel means cylinders 74 and 76. Preferably the second wheel means cylinders are double acting type hydraulic cylinder and piston devices to give a positive vertical control to the second wheel means. Another pair of flexible fluid conduits 206 and 207 connect the fluid source of the tractor 44 to the first wheel means actuating cylinder 164. The conduits 206 and 207 are not shown completely in their full length in the drawings for reasons of clarity, however, they are given the same numerals on the shown ends thereof. The cylinder and piston 164 is preferably a double acting type hydraulic cylinder and piston device as such is necessary to accurately control the position of the wheels 158 and 160 relative to the A-frame structure. Another pair of flexible fluid conduits 208 and 209 connect the fluid source of the tractor 44 to the slide operating cylinder 116. The slide cylinder 116 is preferably an elongated double acting type hydraulic piston and cylinder device as such is desirable for precisely controlling the position of the slide 34 on the A-frame structure 12. The flexible conduits 206, 207, 208, and 209 are preferably held by an elevated support above the forward portion of the A-frame structure 12 and in the vicinity of the transverse folding link conduit mount 82 so as to hold them above the moving parts of the folding structure and prevent their becoming entangled in such structure when it moves from the folded to the extended positions or vice versa. The flexible conduit support can be seen in FIG. 1 and FIG. 4 and is generally indicated at 210. It is to be noted that the cylinder and piston apparatuses of this invention can be either of a hydraulic type, and pneumatic type or any other type fluid actuating device which will adequately operate the structure.

Figure 2:
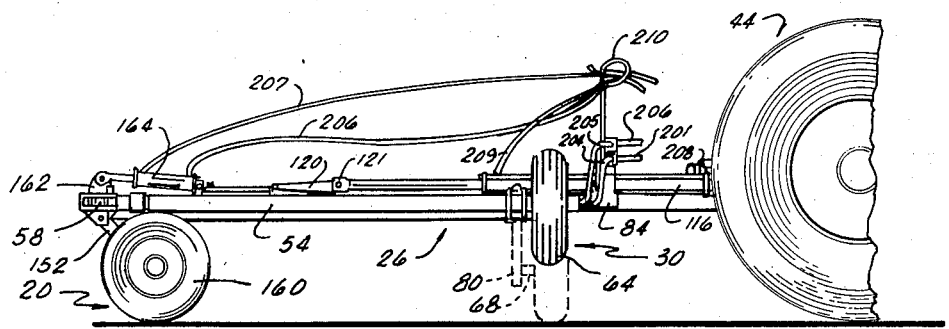
FIG. 2 is a side elevation view of the folding frame structure in the folded position shown attached to the rear of a tractor with the wheel of the second wheel means in a raised position in solid lines and in a lowered position in dashed lines.

When the frame structure 10 is connected to the tractor 44 and is to be transported to the field for use it is positioned as shown in FIG. 3 in the folded position, the second wheel means 28 and 30 are actuated to have the wheels thereof raised above the ground level and the first wheel means 18 and 20 are actuated so as to raise the ground contact points of an implement mounted on the sectional support beam above the surface of the ground a sufficient distance to prevent ground contact. The general position of the frame structure as seen from the side is that shown in FIG. 2 in the solid lines thereof. In order to put the frame structure 10 in this position it is necessary to actuate the second wheel means cylinders 74 to raise the wheels 62 and 64 relative to the ground so they will not drag. To raise the A-frame structure 12 relative to the ground the first wheel means cylinder 164 is actuated to rotate the transverse member 144 thereby lowering the arms 150 and 152 relative to the A-frame structure and in turn raising it relative to the ground level. In the event a grain drill or the like is mounted on the sectional support beam 22 it can be filled before going to the field as the containers thereof will remain in the upright position as they do during actual operation. When it is desired to extend the frame structure 10 for use in the field the slide actuator cylinder 116 is retracted from the position shown in FIG. 3 to the position shown in FIG. 1. Retraction of the slide cylinder 116 causes the pair of forwardly converging folding link conduit means 24 and 26 to move to the extended position as shown in FIG. 1. Once the folding structure 10 has attained the position shown in FIG. 1 the locking pins 110 and 112 are placed in the respective hinge means 100 and 106 to retain the folding link conduit means in the rigid extended position. The first wheel means 28 and 30 and the second wheel means 18 and 20 are adjusted by means of their respective cylinder and piston apparatuses so that the points of the implement mounted on the sectional support beam will contact and enter the ground. At this point it is to be stressed that the first wheel means and second wheel means are independently controllable relative the first wheel means thus providing adjustment of the frame structure for operating on uneven terrain such as on terraces where it may be necessary to raise or lower one portion of the structure relative to another.

In the manufacture of the folding means for implement frame structures of this invention, it is obvious that the structure is so designed to achieve the desired end product, that being a fluid actuated folding frame structure on which implements can be mounted and carried in a horizontal position when the structure is in its folded position or in its extended position. The specific manufacture of the folding means can be accomplished by methods and with materials commonly used for the manufacture of agricultural implement structures. The structure includes a combination of standard components and easily manufacturable supports, hinges, and frames.

In the use and operation of the folding means for implement frame structures of this invention, it is seen that same provides a foldable structure for the mounting of implements such as grain drills and the like which can be easily folded for transporting or extended for field use and at all times retained in a horizontal position. The folding means provides an easily operated fluid actuated apparatus for the folding and unfolding of the structure in a horizontal position and additionally raising and lowering of the structure relative to the ground.

As will become apparent from the foregoing description of the applicant's folding means for implement frame structures, relatively simple and useful means have been provided to fold the frame structure from an extended position to a folded position. The folding means is compatible with tractors and other towing vehicles in that it can be hydraulically and remotely operated from the operator's seat of the vehicle. The folding means is a mechanically simple structure and provides a great deal of protection for the flexible fluid conduits used in operation of the height adjusting wheel means. The structure is simple to use in that it can be controlled by an operator from his seat on the towing vehicle and it is usable to support various types of farm implements.

While the invention has been described in conjunction with preferred specific embodiments thereof, it will be understood that this description is intended to illustrate and not limit the scope of the invention which is defined by the following claims.

I claim:

1. A foldable frame means for an implement or the like comprising:
   a. a frame structure adapted to be connected to a towing means;
   b. a first wheel means pivotally connected to said frame structure;

c. said frame structure having a rear transverse support beam with an end section pivotally connected to an end portion of said support beam, d. a second wheel means pivotally connected to said end section of said support beam;

e. a folding link means having one end pivotally connected to said frame structure and the other end pivotally connected to the end portion of said end section of said support beam, said folding link means being hollow and internally receiving and mounting an operating fluid conduit communicating between a fluid source and a means to elevate said second wheel means; and f. folding link moving means having a power means mounted with said frame structure, and having a connecting means pivotally connected between said power means and said folding link means, said frame structure, said folding link means and said end section on said support beam being constructed and connected as above so that said end section is pivoted in a horizontal forward direction with respect to said support beam when said frame means is in a folded position, said folding link moving means providing means to fold and unfold said foldable frame means.

2. The foldable frame means of claim 1, wherein said frame structure is generally horizontally disposed A-shaped frame means provided with a generally centrally positioned and longitudinal tongue member, and said first wheel means is pivotally connected to said A-shaped frame means to support said A-shaped frame means.

3. The foldable frame means of claim 2, wherein;

a. said powering means is a cylinder and piston means mounted on said tongue member of said A-shaped frame means;

b. said connecting rod means has connecting rod member having one end pivotally attached to the end of said powering means and the other end thereof pivotally attached said folding link conduit means; and c. said cylinder and piston means is in fluid communication with said fluid source.

4. The foldable frame structure of claim 1, wherein said power means is a cylinder and piston means in fluid communication with a fluid source carried by said towing means and having one end thereof attached to a slide member mounted on said frame means, and said slide member pivotally attached to said connecting rod means.

5. The frame structure according to claim 1 which comprises:

a. generally horizontally disposed A-shaped frame means provided with a central and longitudinal tongue member, b. opposed end sections pivotally connected to end portions of said support beam, and having second wheel means connected to each, c. said first wheel means pivotally connected to said A-shaped frame means to support said A-shaped frame means, d. a first cylinder and piston means mounted on said tongue means, e. said second wheel means having a second cylinder and piston means for raising and lowering said second wheel means in response thereto, said second cylinder and piston means operating independently of said first cylinder and piston means, f. said folding link means having a plurality of folding link members, first of said link members having an inlet and outlet at their extremities, second of said link members having an inlet and outlet at their extremities, hinge means positioned between adjacent ends of said first and second link members.

6. In foldable frame means for an implement or the like having a horizontally disposed A-shaped frame structure provided with a generally centrally positioned and longitudinally extending tongue adapted to be connected to a towing means, and wheel means pivotally connected to said frame structure to support same on the ground and to move up and down relative said frame, the improvement, comprising:

a. a rear transverse support beam with said frame and having a center section and end sections pivotally connected to and extending from said center section;

b. a second wheel means pivotally connected to said end sections to support same on the ground and to move up and down relative said end sections;

c. folding link means having one end pivotally connected to said frame structure and the other end pivotally connected to the end portion of said end section of said support beam, said folding link means being hollow and internally receiving and mounting an operating fluid conduit communicating between a fluid source and a means to elevate said second wheel means;

d. slide means movably mounted on said tongue to be movable longitudinally therealong;

e. piston and cylinder means attached to said frame structure and connected to said slide means to move said slide means; and f. connecting means pivotally connected between said slide means and said folding link means; said folding link means and said end sections being constructed and adapted to in operation be pivotally moved while substantially horizontally disposed in a generally forward direction relative said center section of said frame structure between an extended position and a folded position by said slide means and said connecting means as said slide means is moved in one direction therealong said tongue by said piston and cylinder means, and said folding link means and said end sections are adapted to be moved while substantially horizontally disposed in a generally rearward direction relative said center section of said frame structure when moved between a folded position and an extended position by said slide means being moved by said piston and cylinder means in a direction opposite said one direction.

* * * * *